United States Patent [19]

Kerr et al.

[11] Patent Number: 5,604,291
[45] Date of Patent: Feb. 18, 1997

[54] TELOMERS

[75] Inventors: Elizabeth A. Kerr, Knutsford; Jan Rideout, Bolton, both of England

[73] Assignee: FMC Corporation (UK) Limited, Manchester, England

[21] Appl. No.: 308,038

[22] Filed: Sep. 16, 1994

Related U.S. Application Data

[62] Division of Ser. No. 887,622, May 22, 1992, Pat. No. 5,376,731.

[30] Foreign Application Priority Data

May 31, 1991 [GB] United Kingdom .................. 9111704

[51] Int. Cl.$^6$ ........................................ C08F 30/02
[52] U.S. Cl. .................... 526/240; 526/271; 526/287; 526/317.1; 526/318.5; 526/273; 526/277; 526/278; 526/303.1; 526/304; 526/193; 525/340
[58] Field of Search .................... 526/287, 271, 526/317.1, 318.5, 240, 193; 525/340

[56] References Cited

U.S. PATENT DOCUMENTS

| | | | |
|---|---|---|---|
| 3,539,654 | 11/1970 | Pautrat et al. | 260/768 |
| 4,046,707 | 9/1977 | Smith et al. | 252/180 |
| 4,681,686 | 7/1987 | Richardson et al. | 210/699 |
| 5,077,361 | 12/1991 | Hughes et al. | 526/233 |
| 5,294,687 | 3/1994 | Blankenship et al. | 526/233 |

FOREIGN PATENT DOCUMENTS

| | | |
|---|---|---|
| 0150706 | 8/1985 | European Pat. Off. . |
| 0175317 | 3/1986 | European Pat. Off. . |
| 0352949 | 1/1990 | European Pat. Off. . |
| 0360746 | 3/1990 | European Pat. Off. . |
| 0360747 | 3/1990 | European Pat. Off. . |
| 0405818 | 1/1991 | European Pat. Off. . |
| 1072796 | 6/1967 | United Kingdom . |
| 1178308 | 1/1970 | United Kingdom . |

OTHER PUBLICATIONS

British Search Report Oct. 2, 1991.
Russian Technical Journal Izv. Akad. Nauk. USSR 1989, 1390.
Partial translation of above Russian article.

*Primary Examiner*—Mark Nagumo
*Attorney, Agent, or Firm*—Patrick C. Baker; Robert L. Andersen; Charles C. Fellows

[57] ABSTRACT

Phosphonic telomer intermediates for preparing the telomers of U.S. Pat. No. 5,376,731 may be produced by an aqueous process comprising (a) reacting hypophosphorous acid with a carbonyl compound which is preferably an aldehyde, a ketone or an imine, and (b) reacting the product of (a) with an olefinic reactant or reactants in the presence of a suitable initiator especially a free radical initiator. The telomer intermediates are themselves useful as scale inhibitors in aqueous systems.

5 Claims, No Drawings

TELOMERS

This application is a division of application Ser. No. 07/887,622, filed May 22, 1992 now U.S. Pat. No. 5,376,731.

The present invention relates to new phosphonic (co)telomers having scale inhibiting properties per se; to their production; and to their use as intermediates for other scale-inhibiting and/or corrosion-inhibiting (co)telomers.

The majority of natural waters, and aqueous systems in general, contain dissolved salts of metals such as calcium, magnesium, barium and strontium. When the water or aqueous system is subjected to heating, the dissolved salts may be convened to insoluble salts and deposited as scale on heat transfer surfaces in contact with the water or aqueous system. If the water or aqueous system is concentrated, even without heating, insoluble salts may also be precipitated.

Salt precipitation and scale deposition are troublesome and can cause increased costs in maintaining aqueous systems in good working order.

There is a need, in this field, for a composition which can be added to water or aqueous systems in very small quantities and which can cut down the rate at which insoluble salts are precipitated over a wide temperature range, and can also disperse those insoluble salts which are precipitated. Furthermore, when any scale is formed, it should desirably be easily removeable from surfaces by simple mechanical means.

A number of additives have been proposed for addition to water or aqueous systems for these purposes.

In the U.S. Pat. No. 4,046,707 there are described scale-inhibiting (co)telomers having the formula:

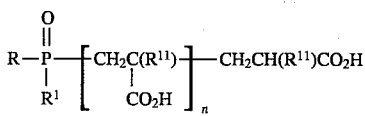

and salts thereof, in which $R^{11}$ is hydrogen, methyl or ethyl; R is hydrogen, $C_1$-$C_{18}$ alkyl, $C_5$-$C_{12}$ cycloalkyl, aryl, aralkyl, a residue of formula:

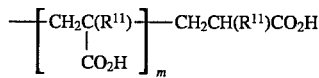

in which $R^{11}$ has its previous significance, and the sum of m and n is an integer of at most 100, or R is OX in which X is hydrogen or $C_1$-$C_4$ alkyl; and $R^1$ is a residue OX in which X has its previous significance.

In EP Patent 150706, scale inhibiting cotelomer compounds are disclosed having the formula:

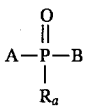

and salts thereof, in which $R_a$ is —OX in which X is hydrogen, an alkali- or alkaline earth metal, ammonium or an amine residue; B is hydrogen or A; A is a random polymeric residue comprising at least one unit of formula:

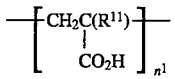

in which $R^{11}$ is hydrogen, methyl or ethyl; and at least one different unit of formula:

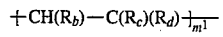

in which $R_b$ is hydrogen, methyl or $CO_2R_e$ in which $R_e$ is hydrogen or $C_1$-$C_8$ alkyl optionally substituted by hydroxy, $R_c$ is hydrogen, $C_1$-$C_4$ alkyl, hydroxymethyl or $CO_2R_f$ in which $R_f$ is hydrogen, a residue of formula:

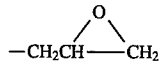

a residue —[$CH_2$—$CH(R_g)O$]$_z$H in which $R_g$ is hydrogen, methyl or phenyl and z is an integer from 1 to 20, or $R_f$ is $C_1$-$C_8$ alkyl optionally substituted by hydroxy or by $SO_3M$, in which M is hydrogen or an alkali- or alkaline earth metal atom, $R_d$ is $CO_2R_e$ in which $R_e$ is as above, or $R_d$ is $C_1$-$C_8$ alkyl optionally substituted by 1 or 2 carboxyl groups, phenyl, acetyl, hydroxymethyl, acetomethyl, $SO_3M$, $CH_2SO_3M$ or $PO_3M_2$, in which M has its previous significance, $CONR_hR_i$ in which $R_h$ and $R_i$ are the same or different and each is hydrogen, $C_1$-$C_8$ alkyl, hydroxymethyl, $CH(OH)CO_2M$ or $C(CH_3)_2$ $CH_2SO_3M$, in which M has its previous significance or $N(R_j)COCH_3$ in which $R_j$ is hydrogen or $C_1$-$C_4$ alkyl; and $m^1$ and $n^1$ are integers such that the sum of $m^1$ and $n^1$ ranges from 3 to 100, and the ratio $n^1$:$m^1$ ranges from 99:1 to 1:99, provided that the resulting telomers are water-soluble. The values of $m^1$ and/or $n^1$ in a residue A may be the same as, or different from the values of $m^1$ and/or $n^1$ in a residue B.

EP-A-360746 describes cotelomer compounds having the formula:

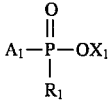

and salts thereof, in which $X_1$ is hydrogen, $C_1$-$C_4$ alkyl, phenyl, alkali metal- or alkaline earth metal atom, or an ammonium or amine residue; $R_1$ is $OX_2$ in which $X_2$ may be the same as or different from $X_1$, and is hydrogen, $C_1$-$C_4$ alkyl, phenyl, an alkali- or alkaline earth metal atom or an ammonium or an amine residue, or $X_1$ and $X_2$ together may be a multivalent metal atom forming a neutral complex with anionic moieties of the cotelomer molecule, or $X_1$ and $X_2$ may be linked by a —$CH_2CH_2$— residue to form a ring structure; $A_1$ is a random polymeric residue comprising at least one unit of formula:

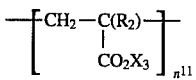

and at least one different unit of formula:

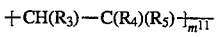

in which $R_2$ is hydrogen or $C_1$-$C_4$ alkyl optionally substituted by one or two carboxyl groups, $X_3$ is the same as or different from $X_1$ and $X_2$ and is hydrogen, $C_1$-$C_4$ alkyl, phenyl, an alkali metal- or alkaline earth metal atom, or an ammonium or an amine residue;

$R_3$ is hydrogen, methyl or a residue $CO_2R_6$ in which $R_6$ is hydrogen or $C_1$-$C_8$ alkyl optionally substituted by a hydroxy group; $R_4$ is hydrogen, $C_1$-$C_4$ alkyl, hydroxymethyl or $CO_2R_7$ in which $R_7$ is hydrogen, a residue of formula:

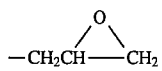

a residue of formula —[$CH_2$—$CH(R_8)O$]$_z$H in which $R_8$ is hydrogen, methyl or phenyl and z is an integer from 1 to 20, or $R_7$ is $C_1$-$C_8$ alkyl optionally substituted by hydroxy or $SO_3X_4$ in which $X_4$ is hydrogen or an alkali or alkaline earth metal atom; $R_5$ is a residue —$CO_2R_7$ in which $R_7$ has its previous significance, $C_1$-$C_8$ alkyl optionally substituted by one or two carboxylic acid groups, or $R_5$ is phenyl optionally substituted by hydroxyl or $SO_3$ $X_4$, or $R_5$ is acetyl, hydroxymethyl, hydroxyl, acetomethyl, $SO_3X_4$, $CH_2SO_3X_4$ or $PO_3(X_4)_2$ in which $X_4$ has its previous significance, —$CONR_9R_{10}$ in which $R_9$ and $R_{10}$ are the same or different and each is hydrogen, $C_1$-$C_8$ alkyl, hydroxymethyl, —$CH(OH)CO_2X_4$, —$C(CH_3)_2CH_2SO_3X_4$, —$C(CH_3)_2CH_2CO_2X_4$ or —$C(CH_3)_2CH_2PO_3(X_4)_2$ in which $X_4$ has its previous significance, or —$N(R_{11})COCH_3$ in which $R_{11}$ is hydrogen, or $C_1$-$C_8$ alkyl; or $R_5$, with $R_3$, may form a carboxylic acid anhydride moiety —CO.O.CO—; and $m^{11}$ and $n^{11}$ are integers such that the sum of $m^{11}$ and $n^{11}$ ranges from 2 to 100, the ratio of $m^{11}$ to $n^{11}$ ranges from 99:1 to 1:99, provided that the resulting copolymer is water-soluble.

These known scale-inhibiting and/or corrosion-inhibiting (co)telomers are conventionally produced by reacting the appropriate olefinic monomer(s) with phosphorous acid, or an ester or salt thereof, in the presence of a reaction initiator e.g. an organic peroxide.

When phosphorous acid per se is used as the reactant, special metallurgical plant may be required, in view of the highly corrosive nature of the acid. The yield of the desired (co)telomer is low and high levels of unreacted phosphorous acid which may need to be removed or are left in the reaction mixture.

In addition, there is the possibility that homo- and/or copolymers of the olefinic monomer may be formed having a low phosphorus content, which are clearly undesired in an end product intended for use as a scale inhibitor.

When a derivative of phosphorous acid e.g. is used as the reactant, although the yields of the desired (co)telomer are improved, the organic reaction mixture requires to be subjected to expensive hydrolysis procedures to obtain the free acid form of the (co)telomer and expensive separation procedures to recover the hydrolyzed product from waste products, are required.

We have now found that these problems, associated with known organic reaction systems, can be overcome by the utilization of a new aqueous reaction technique.

Accordingly, the present invention provides an aqueous process for the production of a (co)telomer having the formula I:

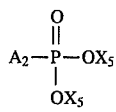

I in which $X_5$ is hydrogen, $C_1$-$C_4$ alkyl, phenyl, an alkali metal—or alkaline earth metal atom, or an ammonium or amine residue; $A_2$ is a homopolymer residue having the formula H:

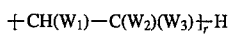

II or $A_2$ is a copolymer residue of formula II comprising two or more different residues —[$CH(W_1)$]—$C(W_1)$— $C(W_2)(W_3)$—]$_r$ in which $W_1$ is hydrogen, methyl or a residue —$CO_2W_4$ in which $W_4$ is hydrogen or $C_1$-$C_8$ alkyl optionally substituted by a hydroxy group, $W_2$ is hydrogen, $C_1$-$C_4$ alkyl, hydroxymethyl, —$CO_2W_5$ in which $W_5$ is hydrogen, a residue of formula:

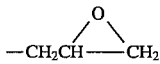

a residue of formula:

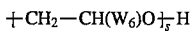

in which $W_6$ is hydrogen, methyl or phenyl and s is an integer from 1 to 100, preferably 1 to 50, especially 1 to 20, or $W_5$ is $C_1$-$C_8$ alkyl which is optionally substituted by $SO_3X_5$ in which $X_5$ has its previous significance;

$W_3$ is a residue —$CO_2W_4$, in which $W_4$ has its previous significance, or $W_3$ is $C_1$-$C_8$ alkyl optionally substituted by one or two carboxylic acid groups, or $W_3$ is a phenyl residue optionally substituted by hydroxyl or $SO_3X_5$ in which $X_5$ has its previous significance, or $W_3$ is acetyl, hydroxymethyl, hydroxyl, acetomethyl, —$SO_3X_5$, —$CH_2SO_3X_5$, or —$PO_3(X_5)_2$ in which $X_5$ has its previous significance, a or $W_3$ is residue —$CONW_7W_8$ in which $W_7$ and $W_8$ are the same or different, and each is hydrogen, $C_1$-$C_8$ alkyl, hydroxymethyl or a residue —$CH(OH)CO_2X_5$, —$C(CH_3)_2CH_2SO_3X_5$, —$C(CH_3)_2CH_2CO_2X_5$ or —$C(CH_3)_2CH_2PO_3(X_5)_2$ in which $X_5$ has its previous significance, or $W_3$ is —$N(W_9)COCH_3$ in which $W_9$ is hydrogen or $C_1$-$C_4$ alkyl, or $W_3$ is —$CH_2[O(CH_2)_p$—]$_s OW_9$ in which $W_9$ and s have their previous significance and p is an integer from 1 to 12 or $W_3$ and $W_1$ may form a carboxylic acid anhydride moiety —CO.O.CO—; and r is an integer ranging from 2 to 100 preferably 4 to 50, especially 4 to 20, which process comprises reacting, in an aqueous medium, a compound having the formula III:

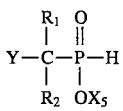

III in which $X_5$ has its previous significance, Y is —$OR_3$ in which $R_3$ is hydrogen or Y is $C_1$-$C_4$ alkyl or —$NR_4R_5$ in which $R_4$ and $R_5$, independently, are hydrogen or $C_1$-$C_4$ alkyl, or $R_4$ and $R_5$, together with the nitrogen atom to which they are bonded can form an N-heterocyclic ring e.g. a pyridine, piperidine or morpholine ring; and $R_1$ and $R_2$, independently, are hydrogen, $C_1$-$C_4$ alkyl or $R_1$ and $R_2$, together with the carbon atom to which they are bonded, may form a cyclopentyl or cyclohexyl ring, with r moles of one or more olefinic reactants of formula IV

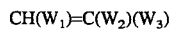

IV in which $W_1$, $W_2$ and $W_3$ have their previous significance to form a compound having the formula V:

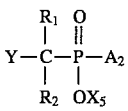

V in which Y, $R_1$, $R_2$, $X_5$ and $A_2$ have their previous significance; and then converting the compound of formula V to a compound of formula I e.g. by reaction with hypochlorite.

Examples of $C_1$-$C_4$ alkyl residues $X_5$, $W_1$, $W_2$, $W_9$, $R_3$, $R_4$ and $R_5$ may be straight or branched chain and include methyl, ethyl, n-propyl, isopropyl and n-butyl residues.

$C_1$-$C_8$ alkyl residues $W_3$, $W_4$, $W_5$, $W_7$ or $W_8$ include, e.g. methyl, ethyl, n-propyl, isopropyl, n-butyl, n-pentyl, n-hexyl and n-octyl groups.

Hydroxy-substituted $C_1$-$C_8$ alkyl residues $W_4$ are, e.g., hydroxymethyl, 2-hydroxyethyl, 2- or 3-hydroxypropyl, 2- or 4-hydroxybutyl, 2- or 6-hydroxyhexyl, and 2- or 8-hydroxyoctyl.

Carboxy-$C_1$-$C_8$ alkyl residues $W_3$ include carboxymethyl, 2-carboxyethyl, 3-carboxypropyl, 4-carboxybutyl, 3,4-dicarboxybutyl, 6-carboxyhexyl and 8-carboxyoctyl.

Alkali metal atoms $X_5$ are, particularly, alkali metals such as sodium or potassium ions, and alkaline earth metal atoms $X_5$ are, especially, calcium, barium or strontium ions. Amine residues $X_5$ are e.g. ammonium, —$NH(CH_3)_3$, —$NH(C_2H_5)_3$ or —$NH(CH_2CH_2OH)_3$.

Preferred (co)telomers of formula I are those in which $A_2$ is a homopolymer residue of formula II in which $W_1$ is hydrogen, $W_2$ is hydrogen or $CO_2W_4$ and $W_3$ has its previous significance or $A_2$ is a copolymer comprising at least one unit of formula II in which $W_1$ is hydrogen, $W_2$ is hydrogen or $CO_2W_4$ and $W_3$ has its previous significance, and at least one unit of formula II in which $W_1$ is hydrogen or —$CO_2W_4$, in which $W_4$ has its previous significance, $W_2$ is hydrogen or —$CO_2W_4$ in which $W_4$ has its previous significance, and $W_3$ has its previous significance.

The reaction of the compound of formula III with the olefinic reactant(s) of formula IV may be performed in the presence of a reaction initiator, generally described in U.S. Pat. No. 2,957,931. Suitable reaction initiators include materials which decompose, under the reaction conditions, to yield free radicals. Examples of such materials are bisazoisobutyronitrile; organic peroxides such as benzoyl peroxide, methylether ketone peroxide, di-tertiary butyl peroxide and monobutyl hydroperoxide; and oxidizing agents such as hydrogen peroxide, sodium perborate and sodium persulphate.

The intermediate products of formula V are new compounds and, as such, form one aspect of the present invention. The intermediate compounds of formula V, per se, exhibit scale-inhibiting properties.

Examples of olefinic reactants of formula IV include acrylic acid, methacrylic acid, 1-carboxymethyl acrylic acid as well as their $C_1$-$C_4$ alkyl or phenyl esters, or alkali metal, alkaline earth metal, ammonium or amine salts, acrylamide, N-hydroxymethylacrylamide, N,N-dimethyl-acrylamide, N-vinyl-N-methylacetamide, N-allylacetamide, N-acrylamidoglycollic acid, methacrylic acid, methyl methacrylate, ethyl acrylate, 2-hydroxyethyl methacrylate, 2-hydroxypropyl methacrylate, 2-hydroxyethyl acrylate, 2-hydroxypropyl acrylate; 2-carboxyethyl acrylate; maleic acid; maleic anhydride; a maleimide; 3-butene-1,2,3-tri-carboxylic acid; dimethyl maleate; diethyl maleate; diethyl fumarate; itaconic acid; dimethyl itaconate; vinyl sulphonic acid; allyl sulphonic acid; 4-styrene sulfonic acid; sodium- or potassium salts of 3-sulphopropyl acrylic acid; 2-acrylamido-2-methyl-propanesulphonic acid; vinyl phosphonic acid; styrene phosphonic acid; allyl alcohol; allyl acetate; vinyl acetate; styrene; a-methyl styrene; hexene; octene; N-acrylamidopropanesulphonic acid; glycidyl methacrylate; crotonic acid; ethyl crotonate; polyethylene glycol esters; polypropylene glycol esters of (meth)acrylic acids and allyl polyethylene or propylene glycol ethers.

The compounds of formula III may be produced by reacting hypophosphorous acid having the formula VI:

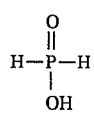

VI with a compound having the formula VII:

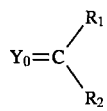

VII in which $Y_o$ is O or $NR_4$, and $R_1$ and $R_2$ have their previous significance.

The reaction may be conveniently performed by firstly, adding mineral acid, e.g. hydrochloric acid, to a salt or ester of hypophosphorous acid, e.g. sodium hypophosphite, to generate hypophosphorous acid in situ. The compound of formula VII may then be added. The reaction is preferably conducted at elevated temperature, conveniently at the reflux temperature of the reaction mixture. The product of formula III may be isolated, as free acid, salt or ester, by conventional method.

When Y in the compounds of formula III is —$NR_4R_5$, such compounds may be produced by reacting hypophosphorous acid with a compound of formula O=C $R_1R_2$ VIIA in which $R_1$ and $R_2$ have their previous significance in the presence of an amine $R_4R_5NH$.

Examples of carbonyl reactants of formula VII or VIIA include formaldehyde, acetaldehyde, propionaldehyde, butyraldehyde, acetone, methylethylketone, diethylketone, dipropylketone, dibutylketone, cyclopentanone and cyclohexanone; and examples of imine reactants VII are methylethylketimine and cyclohexylketimine.

The products of formula I, produced by the process of the present invention are obtained as aqueous solutions.

These solutions may be subjected to partial or complete evaporation under reduced pressure. The unpurified reaction products may be used directly as scale-inhibiting (co)telomeric products. The reaction products may be purified if desired. Examples of suitable purification procedures are:

i) by evaporation of the aqueous reaction solvent, dissolving the residue in water, washing with a water immiscible organic solvent e.g. ether and evaporation of the aqueous solution, ii) by evaporation of the aqueous reaction solvent, dissolving the residue in a suitable solvent, e.g. methanol, and reprecipitation by addition of a non-solvent e.g. ether.

If desired, any acid groups so obtained may be converted, by conventional methods, into the corresponding salt groups.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralisation and only the product of the invention need be added.

The present invention also provides a method of treating an aqueous system, to inhibit scale formation or fouling therein and/or to inhibit corrosion of metal surfaces in contact with the aqueous system, comprising adding to the system a (co)telomer compound of formula V or a salt thereof.

In practice, the amount of the compound of formula V used to treat the aqueous system may vary according to the protective function which the compound is required to perform.

For example, for corrosion-inhibiting protective treatments, optionally with simultaneous scale-inhibiting treatments, the amount of the compound of formula V added to the aqueous system may range from 0.1 to 50,000 ppm (0.00001 to 5% by weight), preferably from 1 to 500 ppm (0.0001 to 0.05% by weight), based on the weight of the aqueous system.

For solely anti-scale treatments, the amount of the compound of formula V added is conveniently from 1 to 200, preferably 1 to 30 ppm, based on the aqueous system.

For most relatively dilute aqueous dispersions to be treated, the amount of compound of formula V to be added as dispersant/antifoulant is conveniently from 1 to 200 ppm, preferably 2–20 ppm by weight. Aqueous slurries to be treated, however, may require much higher levels of compound of formula V e.g. from 0.1 to 5% by weight on total solids—which can be as high as 70% by weight of the total aqueous system.

When used to inhibit deposition of scale and the precipitation of salts from aqueous solutions, the compounds of formula V, or salts thereof, are particularly effective in inhibiting deposition of scale-forming salts derived from calcium, magnesium, barium or strontium cations, and anions such as sulphate, carbonate, hydroxide, phosphate and silicate.

With respect to aqueous systems which may be treated according to the present invention, of particular interest with respect to combined corrosion inhibition and anti-scale treatments are cooling water system, steam generating systems, sea-water evaporators, reverse osmosis equipment, paper manufacturing equipment, sugar evaporator equipment, soil irrigation systems, hydrostatic cookers, gas scrubbing systems, closed circuit heating systems, aqueous-based refrigeration systems and down-well systems; for corrosion inhibition treatments alone, aqueous systems of particular interest include aqueous machining fluid formulations (e.g. for use in boring, milling, reaming, broaching, drawings, spinning, turning, cutting, sawing, grinding, and thread-cutting operations or in non-cutting shaping in drawing or rolling operations) aqueous scouring systems, engine coolants including aqueous glycol antifreeze systems, water/glycol hydraulic fluids; and aqueous based polymer surface-coating systems/or solvent-based polymer systems, e.g. those containing tetrahydrofuran, ketones or alkoxyalkanols.

The inhibitor compound of formula V used according to the invention may be used alone, or in conjunction with other compounds known to be useful in the treatment of aqueous systems.

In the treatment of systems which are completely aqueous, such as cooling water systems, air-conditioning systems, steam-generating systems, sea-water evaporator systems, hydrostatic cookers, and closed circuit heating or refrigerant systems, further corrosion inhibitors may be used such as, for example, water soluble zinc salts; phosphates; polyphosphates; phosphonic acids and their salts, for example, hydroxyethyl diphosphonic acid (HEDP), nitrilotris methylene phosphonic acid and methylamino dimethylene phosphonocarboxylic acids and their salts, for example, those described in German Offenlegungsschrift 2632774, hydroxyphosphonoacetic acid, 2-phosphonobutane-1,2,4-tri-carboxylic acid (PBSAM) and those disclosed in GB 1572406; nitrates, for example, sodium nitrate; nitrites, e.g. sodium nitrite; molybdates, e.g. sodium molybdate, tungstates e.g. sodium tungstate; silicates, e.g. sodium silicate; benzotriazole, bis-benzotriazole or copper deactivating benzotriazole or tolutriazole derivatives e.g. their Mannich base derivatives; mercaptobenzotriazole; N-acyl sarcosines; N-acylimino diacetic acids; ethanolamines; fatty amines; and polycarboxylic acids, for example, polymaleic acid and polyacrylic acid, as well as their respective alkali metal salts, copolymers of maleic anhydride, e.g. copolymers of maleic anhydride and sulfonated styrene, copolymers of acrylic acid, e.g. copolymers of acrylic acid and hydroxyalkylated acrylic acid, and substituted derivatives of polymaleic and polyacrylic acids and their copolymers. Moreover, in such completely aqueous systems, the inhibitor used according to the invention may be used in conjuction with further dispersing and/or threshold agents, e.g. polymerised acrylic acid (or its salts), phosphino-polycarboxylic acids (as described and claimed in British Patent 1458235), the cotelomeric compounds described in European Patent Application No: 0150706, hydrolysed polyacrylonitrile, polymerised methacrylic acid and its salts, polyacrylamide and copolymers thereof from acrylic and methacrylic acids, lignin sulphonic acid and its salts, tannin, napthalene sulphonic acid/formaldehyde condensation products, starch and its derivatives, cellulose, acrylic acid/lower alkyl hydroxy-acrylate copolymers, e.g. those described in U.S. Pat. No. 4,029,577, styrene/maleic anhydride copolymers and sulfonated styrene homopolymers, e.g. those described in U.S. Pat. No. 4,374,733 and combinations thereof. Specific threshold agents, such as for example, 2-phosphonobutane-1,2,4-wi-carboxylic acid (PBSAM), hydroxyethyl diphosphonic acid (HEDP), hydrolysed polymaleic anhydride and its salts, alkyl phosphonic acids, hydroxyphosphonoacetic acid, 1-aminoalkyl-1,1-diphosphonic acids and their salts, and alkali metal polyphosphates, may also be used.

Particularly interesting additive packages are those comprising compounds of formula V with one or more of polymaleic acid or polyacrylic acid or their copolymers, or substituted copolymers, hydroxyphosphonoacetic acid, HEDP, PBSAM, triazoles such as tolutriazole, molybdates and nitrites.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones, e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compounds, chloro-phenols, sulphur-containing compounds such as sulphones, methylene bis thiocyanates and carbamates, isothiazolones, brominated propionamides, triazines, phosphonium compounds, chlorine and chlorine-release agents bromine and bromine release agents and organometallic compounds such as tributyl tin oxide, may be used.

If the system to be treated by the method of the invention is not completely aqueous, e.g. an aqueous machining fluid formulation, it may be e.g. a water dilutable cutting or grinding fluid.

The aqueous machining fluid formulations of the invention may be, e.g. metal working formulations. By "metal working", we mean reaming, broaching, drawing, spinning, cutting, grinding, boring, milling, turning, sawing, non-cutting shaping or rolling. Examples of water-dilutable cutting or grinding fluids into which the corrosion inhibiting combination may be incorporated include:

a) aqueous concentrates of one or more corrosion inhibitors, and optionally one or more anti-wear additives, used as dilutions of 1:50 to 1:100, which are usually employed as grinding fluids;

b) polyglycols containing biocides, corrosion inhibitors and anti-wear additives which are used as dilutions of 1:20 to 1:40 for cutting operations and 1:60 to 1:80 for grinding;

c) semi-synthetic cutting fluids similar to (b) but containing in addition 10 to 25% oil with sufficient emulsifier to render the water diluted product translucent;

d) an emulsifiable mineral oil concentrate containing, for example, emulsifiers, corrosion inhibitors, extreme pressure/anti-wear additives, biocides, anti-foaming agents, coupling agents etc; they are generally diluted from 1:10 to 1:50 with water to a white opaque emulsion;

e) a product similar to (d) containing less oil and more emulsifier which, on dilution to the range 1:50 to 1:100, gives a translucent emulsion for cutting or grinding operations.

For those partly-aqueous systems in which the aqueous system component is an aqueous machining fluid formulation, the inhibitor of formula V used according to the invention may be used singly, or in admixture with other additives, e.g. known further corrosion inhibitors and/or extreme-pressure additives.

Examples of other corrosion inhibitors which may be used in these aqueous systems, in addition to the inhibitor composition used according to the invention, include the following groups:

a) Organic acids, their esters or ammonium, amine, alkanol-amine and metal salts, for example, benzoic acid, p-tert-butyl benzoic acid, disodium sebacate, triethanolamine laurate, iso-nonanoic acid, triethanolamine salt of (p-toluene sulphonamido caproic acid), triethanolamine salt of benzene sulphonamido caproic acid, triethanolamine salts of 5-ketocarboxylic acid derivatives as described in European Patent No: 41927, sodium N-lauroyl sarcosinate or nonyl phenoxy acetic acid;

b) Nitrogen containing materials such as the following types: fatty acid alkanolamides; imidazolines, for example, 1-hydroxy-ethyl-2-oleyl-imidazolines; oxazolines; triazoles for example, benzotriazoles, or their Mannich base derivatives; triethanolamines; fatty amines; inorganic salts, for example, sodium nitrate; and the carboxy-triazine compounds described in European Patent Application No: 46139;

c) Phosphorus containing materials such as the following types: amine phosphates, phosphonic acids or inorganic salts, for example, sodium dihydrogen phosphate or zinc phosphate;

d) Sulphur containing compounds such as the following types: sodium, calcium or barium petroleum sulphonates, or heterocyclics, for example, sodium mercaptobenzothiazole.

Nitrogen-containing materials, particularly triethanolamine, are preferred.

Examples of extreme pressure additives which may be present in the systems treated according to the present invention include sulphur and/or phosphorus and/or halogen containing materials, for instance, sulphurised sperm oil, sulphurised fats, tritolyl phosphate, chlorinated paraffins or ethoxylated phosphate esters.

When triethanolamine is present in the aqueous systems treated according to the present invention, it is preferably present in an amount such that the ratio of inhibitor composition to triethanolamine is from 2:1 to 1:20.

The partly-aqueous systems treated by the method of the present invention may also be aqueous surface-coating compositions, e.g. emulsion paints and aqueous powder coatings for metallic substrates.

The aqueous surface-coating composition may be, e.g. a paint such as a styrene-acrylic copolymer emulsion paint, a resin, latex, or other aqueous based polymer surface-coating systems, to coat a metal substrate. The inhibitor composition used according to the invention may be employed to prevent flash rusting of the metal substrate during application of the surface coating and to prevent subsequent corrosion during use of the coated metal.

In aqueous surface-coating compositions treated by the method of the invention the inhibitor composition may be used singly, or in admixture with other additives, e.g. known corrosion inhibitors, biocides, emulsifiers and/or pigments.

The further known corrosion inhibitors which may be used are, e.g. those of classes a), b), c) and d) hereinbefore defined.

Examples of biocides which may be used in these aqueous systems, in addition to the compound of formula V, include the following:

Phenols, and alkyl- and halogenated phenols, for example, pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of pigments which may be used in these aqueous systems, in addition to the compound of formula V, include titanium dioxide, zinc chromate, iron oxide and organic pigments such as the phthalocyanines.

As already indicated, the cotelomers of formula V also function as dispersing agents and/or antifoulants towards common deposits, e.g. iron oxides and/or iron salts, calcium and magnesium deposits, e.g. their carbonates, sulphates, oxalates and phosphates, and silt, alumina, silicates and clays found in such waters.

In particular, the method of the present invention may be applied to disperse deposits in an aqueous system containing 5–1500 ppm by weight of calcium ion as well as suspended solids.

This aspect of the present invention finds particular use in the china clay industry in which it is important to obtain slurries which will not appreciably separate out during transportation from the clay pits to the user. At high concentrations of suspended solids in these slurries, the cotelomers of formula V have been found to disperse china clay and to be of value as "in-process" dispersants and as grinding aids.

The following Examples further illustrate the present invention.

EXAMPLE 1

To 44 g of sodium hypophosphite are added slowly 102 g of hydrochloric acid (36%) followed by 43.5 g of acetone. The mixture is heated with mixing to reflux for 7 hours. The product is washed twice with distilled water. 24 g of NaOH are added and the resulting solution evaporated to dryness. 90 g of product (92% yield based on sodium hypophosphite) is obtained. $^{31}$p nmr shows a main peak at 39.3 ppm due to product. %P=13.5%.

EXAMPLE 2

The method in Example 1 is repeated but using 17.6 g of sodium hypophosphite, 39.46 g of 37% HCl and 21.6 g of methyl ethyl ketone. The mixture is heated, with mixing, to reflux for 8 hours. The product is washed twice with distilled water. 12.2 g of NaOH is added and the resulting solution evaporated to dryness. 44.26 g of product (95.56% yield based on sodium hypophosphite) is gained $^{31}$Pnmr shows a main peak at 39.7 ppm %P=10.62%.

EXAMPLE 3

Using the method in Example 1, there are reacted 44 g of sodium hypophosphite, 51 g 37% HCl and 22 g acetaldehyde. The mixture is heated with mixing to reflux for 7.5 hours. 18.3 g of NaOH is added and the resulting solution evaporated to dryness. 85 g of product (77.09% yield based on sodium hypophosphite) is gained. $^{31}$Pnmr shows a main peak at 35.7 ppm %P=15.6%.

EXAMPLE 4

To 9.9 g of cyclohexylamine are added, with cooling 13.2 g of hypophosphorous acid (50% solution) followed by 45 g of formaldehyde solution (40%). The solution is heated at 95° C. for 5.5 hours. 2.5 g of NaOH are added and the resulting solution is evaporated to dryness. 18.4 g of product (51.7% yield, based on hypophosphorous acid) are obtained. $^{31}$Pnmr shows a main peg at 10 ppm due to the product %P=12.0%.

EXAMPLE 5

Using the method described in Example 1, there are reacted 22 g sodium hypophosphite, 74 g 37% HCl and 24.5 g cyclohexanone. The mixture is heated, with mixing, to reflux for 8 hours. 32 g of NaOH are added and the resulting solution is evaporated to dryness. 32.1 g of product (94.2% yield based on sodium hypophosphite) is obtained. $^{31}$Pnmr shows a main peak at 37.9 ppm. %P=15.49%.

EXAMPLE 6

To 100.6 g of the product of Example 1 in 352 g water are added, separately, 23.83 g of sodium persulphate in 160 g of water and 576 g of acrylic acid with 82.3 g of the product of Example 1 in 240 g of water, dropwise, over 5 hours, with stirring at 80° C. The temperature is maintained at 90° C. for one hour then increased to 100° C. for a second hour, to produce 1504.5 g of product of solids content 50%. The product has and $M_n$=1144 and an $M_w$=2393 and % P=2.6.

EXAMPLE 7

To 19.7 g of the product of Example 1 in 70 grams of distilled water are added, separately, 4.77 g of sodium persulphate in 32 g of water and 28.8 g of acrylic acid with 16.12 g of the product of Example 1 in 48 mls of distilled water, dropwise, over 2 hours with stirring at 80° C. The temperature is maintained at 80° C. for 1 hour followed by heating for 1 hour at 100° C. to produce 215 g of product of solids content 33%. The product is characterised by GPC with $M_n$ 576, $M_w$ 819 and % phosphorous content of 7%.

EXAMPLE 8

To 19.7 g of the product of Example 1 in 70 mls of water are added, separately, 4.77 g of sodium persulphate in 32mls of water and 144 g of acrylic acid with 16.12 g of the product of Example 1 in 48 mls of water, dropwise, over 2 hrs, with stirring at 80° C. The temperature is maintained at 80° C. for one hour, then increased to 100° C. for a second hour to produce 330.6 g of product of solids content=55%. The product had $M_n$=1706 and $M_w$=2985. %P=2.6.

EXAMPLE 9

To 19.7 g of the product of Example 1 in 70 mls of water, are added, separately 4.77 g of sodium persulphate in 32 mls of water and 86 g of acrylic acid with 16.12 g of the product from Example 1 in 48 mls of water, dropwise, over 2 hrs, with stirring at 80° C. The temperature is maintained at 80° C. for one hour, then increased to 100° C. for a second hour, to produce 274 g of product of solids content=49.4%. The product has $M_n$=1340 and $M_w$=2418. %P=3.9.

EXAMPLE 10

To 9.66 g of the product of Example 5 in 25 mls of water, there are added, separately, 2.38 g of sodium persulphate in 20 mls of water, and 57.6 g of acrylic acid with 9.66 g of the product of Example 5 in 20 mls of water, dropwise, over 2 hours, with stirring, at 80° C. The temperature is increased to 100° C. and held at 100° C. for 2 hours, to produce 149 g of a product having a solids content of 52.36%, $M_n$=973, $M_w$=1745 and %P=3.4.

EXAMPLE 11

To 7.64 g of the product of Example 4 in 20 mls of water, there are added, separately, 1.9 g of sodium persulphate in 15 mls of water and 23.04 g of acrylic acid with 7.64 g of the product of Example 4 in 20 mls of water, dropwise, over 2 hours, with stirring at 80° C. The temperature is then increased to 100° C. and held at 100° C. for 2 hours to produce 76.06 g of a product having a solids content of 43.57%, $M_n$=1707, $M_w$=4616 and % P=4.7.

EXAMPLE 12

To 20.67 g of the product of Example 2 in 70 mls of water, there are added, separately, 4.77 g of sodium persulphate in 30 mls of water and 86.4 g of acrylic acid with 20.67 g of the product of Example 2 in 48 mls of water, dropwise, over 2 hours, with stirring, at 80° C. The temperature is increased to 100° C. and then held at 100° C. for 2 hours, to produce 269.4 g of a product having a solids content of 47.3%, $M_n$=1018, $M_w$=1747 and % P=3.2.

EXAMPLE 13

To 8.85 g of the product of Example 1 in 15 mls of water, are added, separately, 2.38 g of sodium persulphate in 10 mls of water and 416 g of vinyl sulphonic acid (25% in $H_2O$) with 8.85 g of the product of Example 1 in 15 mls of $H_2O$, dropwise, over 2 hrs, with stirring at 80° C. The temperature is maintained at 80° C. for one hour then increased to 100° C. for a second hour, to produce 460 g of product of solids content=35%. The product had $M_n$=517 and $M_w$=651, P=1.5.

EXAMPLE 14

To 17.71 g of the product of Example 1 in 23 mls of water, are added, separately, 2.38 g of sodium persulphate in 16 mls of water and 28.8 g of acrylic acid with 208 g of vinyl sulphonic acid (25% in $H_2O$), dropwise, over 2 hours, with stirring at 80° C. The temperature is maintained at 100° C. for 2 hours to produce 261 g of product of solids content= 42.8%. The product has $M_n$=879 and $M_w$=1850. % P=2.0.

EXAMPLE 15

To 4.43 g of the product of Example 1 in 15 mls of water, are added, separately, 1.19 g of sodium persulphate in 10 mls of water, 78.96 g AMPS (58%) and 14.4 g of acrylic acid with 4.43 g of the product of Example 1 in 10 mls of water, dropwise, over 2 hours, with stirring, at reflux temperature of 100° C. The temperature is then maintained at 100 ° C. for 2 hours to produce 101 g of product of solids content= 56.58%. The product had $M_n$=847 and $M_w$=3634. % P=1.7.

EXAMPLE 16

To 24.35 g of the product of Example 1 in 80 mls of water, are added, separately, 6.55 g of sodium persulphate in 50 mls of water, 78.96 g of AMPS (58%) and 144 g of acrylic acid with 24.35 g of the product of Example 1 in 55 mls of water, dropwise, over 2 hours, with stirring at reflux, 100° C. The temperature is then maintained at 100 ° C. for 2 hours to produce 415.6 g of product of solids content 53.71%. The product had $M_n$=861 and $M_w$=2351. % P=2.7.

EXAMPLE 17

To 8.85 g of the product of Example 1 in 15 mls of water, are added, separately, 1.19 g of sodium persulphate in 5 mls of water, 14.4 g of acrylic acid and 90 g Allyl ether of polyethylene oxide with $M_w$=450, in 50 mls of water, dropwise, over 2 hours with stirring at 95° C. The temperature is maintained at 95° C. for 2 hours to produce 135 g of product of solids content 62.72%. The product has $M_n$=443 and $M_w$=2328, %P=1.2.

EXAMPLE 18

To 8.85 g of the product of Example 1 in 15 g of distilled water are added, separately, 1.19 g of sodium persulphate with 4.9 g of maleic anhydride in 30 g of $H_2O$ and 25.2 g of acrylic acid, dropwise, over 2 hours with stirring at 80° C. The temperature is then raised to 100° C. for 2 hours to produce 75 grams of product with solids content of 50%. The product is characterised by GPC with $M_n$=346 and $M_w$=1721 and a phosphorus content of 30%.

EXAMPLE 19

To 17.7 g of the product of Example 1 in 25 grams of water are added, separately 2.38 g of sodium persulphate with 4.9 g of maleic anhydride in 25 g of $H_2O$ and 25.2 g of acrylic acid, dropwise over 2 hours, with stirring at 80° C. The temperature is then raised to 100° C. for 2 hours to produce 82 g of product with solids content 54%, $M_n$=461, $M_w$=1244 and % P=4.9.

EXAMPLE 20

619 g of sodium hypochlorite solution are added, dropwise, with cooling, over 1 hour to the product of Example 6. The sample is heated to 80° C. for 2 hours to give 2050 g of product with $M_n$=1380 and $M_w$=2560, %P=2.6, solids content 41.7%.

EXAMPLE 21

123 g of sodium hypochlorite solution are added, dropwise, over 1 hour to 200 grams of the product of Example 7. The sample is then heated to 80° C. for 2 hours to give 310 g of product with solids content 27%. The product is characterised by GPC with $M_n$ 632, $M_w$ 867 and %P=4.5.

EXAMPLE 22

123 g of sodium hypochlorite are added dropwise, with cooling, over 1 hour, to the product of Example 8. The sample is heated to 80° C. for 2 hours to give 439 g of product with $M_n$=1829 and $M_w$=3072. % P=3.23%, solids content 47.3%.

EXAMPLE 23

123 g of sodium hypochlorite are added dropwise, with cooling, over 1 hour, to the product of Example 9. The sample is heated to 80° C. for 2 hours to give 350 g of product with $M_n$=1453 and $M_w$=2408. %P=3.23% solids content 36.0%.

EXAMPLE 24

27.79 g of sodium hypochlorite are added, dropwise, with cooling, over 1 hour to 230 g of the product of Example 13. The sample is heated to 80° C. for 2 hours to give 251 g of product with $M_n$=541 and $M_w$=702, and solids content= 34%. P=1.26%.

EXAMPLE 25

35.94 g of sodium hypochlorite are added, dropwise, with cooling, over 1 hour, to 128 g of the product of Example 14. The sample is heated for 4 hours at 80° C. to give 102 g of product with $M_n$=566 and $M_w$=1900. Solids content= 38.68%. %P=1.73%.

EXAMPLE 26

33.0 g of sodium hypochlorite are added, dropwise, with cooling, over 1 hour to 51 g of the product of Example 15. The sample is heated for 6 hours, at 80° C., to give 74 g of product with $M_n$=393 and $M_w$ 3846. P=1.35% solids content 45.8%.

EXAMPLE 27

95.1 g of sodium hypochlorite are added, dropwise, With cooling, over 1 hour, to 207 g of the product of Example 16. The sample is heated to 80° C. for 6 hours to give 278 g of product with $M_n$ 860 and $M_w$=2640. Solid contents=45.27% % P=2.38%.

EXAMPLE 28

33.79 g of sodium hypochlorite m added, dropwise, with cooling, over 1 hour, to 67.4 g of the product of Example 17. The sample is heated to 80° C. for 4 hours to give 251.6 g of product with $M_n$=795 and $M_n$=2403, %P=0.8 solids content 50.1%.

EXAMPLE 29

18.3 grams of sodium hypochlorite solution are added, dropwise, over 30 minutes to 50 g of the product of Example 18. The sample is then heated to 80° C. for 2 hours to give 58.5 g of product of solids content=42%, $M_n$=390 and $M_w$=1947, %P=2.5.

EXAMPLES 30 TO 39

Threshold Test for Calcium Carbonate

The following solutions (a), (b) and (c) are prepared.

a) 1.1 grams of calcium chloride dihydrate and 0.75 grams of magnesium chloride hexahydrate are dissolved in distilled water and the solution is made up to 1 liter.

b) 0.18 gram of sodium carbonate and 0.74 gram of sodium bicarbonate are dissolved in distilled water and the solution is made up to 1 liter.

c) The test compound is dissolved in water to give a solution containing 1000 ppm of active ingredient.

50 mls of solution (a) are placed in a 4oz glass bottle. To this solution is added that volume of solution (c) required to produce a concentration of test compound 1 of 2 ppm in the final volume (100 ml) of test solution (e.g. 0.2 ml of solution (c) produces a concentration of 2 ppm of test compound in the test solution).

50 mls of solution (b) are added and the solutions are mixed. The test solution is stored in a constant temperature bath at 70° C. for 30 minutes. Air is bubbled through the solutions at 0.5 liters/minute per test bottle.

40 mls of the test solution are withdrawn, filtered, a crystal of Patton and Reeder's Reagent (2-hydroxy-1-(2-hydroxy-4-sulpho-1-naphthylazo)-3naphthoic acid) is added, followed by two pellets of sodium hydroxide. The resulting solution is titrated with a standard 0.01M solution of ethylene-diamine tetra-acetic acid di-sodium salt.

The results, set out in the following Table are expressed as % inhibition of precipitation of calcium carbonate relative to a blank titre (i.e. one containing no test compound).

$$\% \text{ Inhibition} = \left[ \frac{\text{Titre} - \text{blank titre}}{\text{Standard titre} - \text{blank titre}} \right] \times 100$$

TABLE

| Example | Test Compound Product of Example No: | % Inhibition at 2 ppm |
| --- | --- | --- |
| 30 | 6 | 89 |
| 31 | 8 | 96 |
| 32 | 9 | 84 |
| 33 | 10 | 94 |
| 34 | 12 | 86 |
| 35 | 16 | 85 |
| 36 | 20 | 98 |
| 37 | 22 | 97 |
| 38 | 27 | 99 |
| 39 | 29 | 91 |

We claim:
1. A telomer having the formula V:

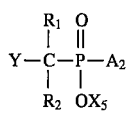

in which $X_5$ is hydrogen, $C_1$-$C_4$ alkyl, phenyl, an alkali metal—alkaline earth metal atom, or an ammonium or amine residue; $A_2$ is a homopolymer residue having the formula II:

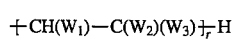

or $A_2$ is a copolymer residue comprising two or more different residues $-[CH(W_1)-C(W_2)(W_3)]_r-$ in which $W_1$ is hydrogen, methyl or a residue $-CO_2W_4$ in which $W_4$ is hydrogen or $C_1$-$C_8$ alkyl, optionally substituted by a hydroxy group, $W_2$ is hydrogen, $C_1$-$C_4$ alkyl, hydroxymethyl, $-CO_2W_5$ in which $W_5$ is hydrogen, a residue of formula:

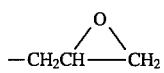

a residue of formula:

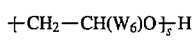

in which $W_6$ is hydrogen, methyl or phenyl and s is an integer ranging from 1 to 100, or $W_5$ is $C_1$-$C_8$ alkyl which is optionally substituted by $SO_3X_5$ in which $X_5$ has its previous significance; $W_3$ is a residue $-CO_2W_4$ in which $W_4$ has its previous significance, or $W_3$ is $C_1$-$C_8$ alkyl optionally substituted by one or two carboxylic acid groups, or $W_3$ is a phenyl residue optionally substituted by hydroxyl or $SO_3X_5$ in which $X_5$ has its previous significance, or $W_3$ is acetyl, hydroxymethyl, hydroxyl, acetomethyl, $SO_3X_5$, $CH_2SO_3X_5$ or $PO_3(X_5)_2$ in which $X_5$ has its previous significance, or $W_3$ is a residue $CONW_7W_8$ in which $W_7$ and $W_8$ are the same or different and each is hydrogen, $C_1$-$C_8$ alkyl, hydroxymethyl or a residue $CH(OH)CO_2X_5$, $C(CH_3)_2CH_2SO_2X_5$, $C(CH_3)_2CH_2CO_2X_5$ or $(CH_3)_2CH_2PO_3(X_5)_2$ in which $X_5$ has its previous significance, or $W_3$ is $N(W_9)COCH_3$ in which $W_9$ is hydrogen or $C_1$-$C_4$ alkyl, or $W_3$ is $-CH_2[O(CH_2)_p]_s-OW_9$ in which $W_9$ and s have their previous significance and p is an integer from 1 to 12; or $W_3$ and $W_1$ may form a carboxylic acid anhydride moiety $-CO.O.CO-$; and r is an integer ranging from 2 to 100;

and in which Y is $OR_3$ in which $R_3$ is hydrogen or $C_1$-$C_4$ alkyl or $NR_4R_5$ in which $R_4$ and $R_5$, independently, are hydrogen or $C_1$-$C_4$ alkyl, or $R_4$ and $R_5$, together with the nitrogen atom to which they are attached, can form an N-heterocyclic ring; and $R_1$ and $R_2$, together with the carbon atom to which they are attached, may form a cyclopentyl or cyclohexyl ring.

2. A Telomer as in claim 1 wherein $A_2$ is a copolymer residue comprising two different residues

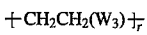

wherein r is as previously defined, and wherein, in the first residue, $W_3$ is COOH, and in the second residue, $W_3$ is $CONH(CH_3)_2$ $SO_3X_5$ wherein $X_5$ is as previously defined.

3. A telomer as in claim 2 wherein $X_5$ is hydrogen or alkali metal.

4. A telomer as in claim 2 wherein $X_5$ is hydrogen or alkali metal and r is 4 to 50.

5. A telomer as in claim 2 wherein $X_5$ is hydrogen or alkali metal and r is 4 to 20.

* * * * *